(12) United States Patent
Lee

(10) Patent No.: US 6,779,127 B1
(45) Date of Patent: Aug. 17, 2004

(54) APPARATUS INCLUDING DIRECTORY SERVER, FOR DETECTING OPERATIONS OF DEVICES, AND METHOD USED BY THE APPARATUS

(75) Inventor: Jin-woo Lee, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 361 days.

(21) Appl. No.: 09/676,093

(22) Filed: Oct. 2, 2000

(30) Foreign Application Priority Data

Oct. 2, 1999 (KR) ........................................ 1999-42506

(51) Int. Cl.$^7$ ................................................ G06F 11/00
(52) U.S. Cl. ............................. 714/4; 714/43; 709/224
(58) Field of Search .............................. 714/4, 43, 51, 714/55; 709/224

(56) References Cited

U.S. PATENT DOCUMENTS

| | | | |
|---|---|---|---|
| 4,680,753 A | | 7/1987 | Fulton et al. |
| 5,109,486 A | * | 4/1992 | Seymour .................... 709/224 |
| 5,367,670 A | * | 11/1994 | Ward et al. .................... 714/47 |
| 5,440,726 A | * | 8/1995 | Fuchs et al. .................. 714/20 |
| 5,471,399 A | * | 11/1995 | Tanaka et al. ................. 716/11 |
| 5,715,386 A | * | 2/1998 | Fulton et al. .................. 714/38 |
| 5,748,882 A | * | 5/1998 | Huang ......................... 714/47 |
| 5,764,913 A | * | 6/1998 | Jancke et al. ................ 709/224 |
| 5,926,463 A | | 7/1999 | Ahearn et al. |
| 6,021,429 A | * | 2/2000 | Danknick ................... 709/208 |
| 6,049,828 A | * | 4/2000 | Dev et al. .................... 709/224 |
| 6,249,883 B1 | * | 6/2001 | Cassidy et al. ............... 714/42 |
| 6,349,335 B1 | * | 2/2002 | Jenney ....................... 709/224 |
| 6,456,306 B1 | * | 9/2002 | Chin et al. ................... 345/810 |
| 6,496,942 B1 | * | 12/2002 | Schoenthal et al. ............. 714/4 |
| 6,526,442 B1 | * | 2/2003 | Stupek et al. ................ 709/224 |

FOREIGN PATENT DOCUMENTS

| | | |
|---|---|---|
| JP | 61-257039 A | 11/1986 |
| JP | 06-250963 A | 9/1994 |
| JP | 11-120012 A | 4/1999 |

OTHER PUBLICATIONS

Swartzendruber, Michael; Using a Web Server for System Performance Monitoring and Management; Sep. 1998; Microsoft Interactive Developer; http://www.microsoft.com/mind/0998/weasel.asp.*

Moghe et al., "RAP–Rate Adaptive Polling for Network Management Applications", *Network Operations and Management Symposium*, NOMS 98, pp. 395–399, Feb. 1998, XP010267413.

\* cited by examiner

*Primary Examiner*—Scott Baderman
*Assistant Examiner*—Joshua Lohn
(74) *Attorney, Agent, or Firm*—Sughrue Mion, PLLC

(57) ABSTRACT

A data communications apparatus and a data communications method, the apparatus including a directory server, for detecting the operations of devices, and a method used by the apparatus, which shows a list of normal devices to a user by removing abnormal devices from the list managed by the directory server when devices start to function abnormally. A method for detecting the operations of devices using a directory server in a communication apparatus that includes a plurality of devices, a directory daemon for monitoring the devices, a directory server, and a web server, includes (a) the devices transmitting alive check data to the directory daemon at predetermined intervals, (b) the directory daemon transmitting the result obtained by receiving the alive check data to the directory server, (c) the directory daemon transmitting a device management command to the directory server at predetermined intervals, and (d) the directory server deleting the devices which have not transmitted the alive check data for a predetermined time from a management list and transmitting a list of deleted devices to the devices not deleted, according to the management command. According to the above apparatus and method, only a list of currently normal devices is shown to a user by deleting abnormal devices from the management list of the directory server when devices become abnormal. Therefore, it is possible to check whether devices normally operate, to thus let the user conveniently use the devices.

4 Claims, 2 Drawing Sheets

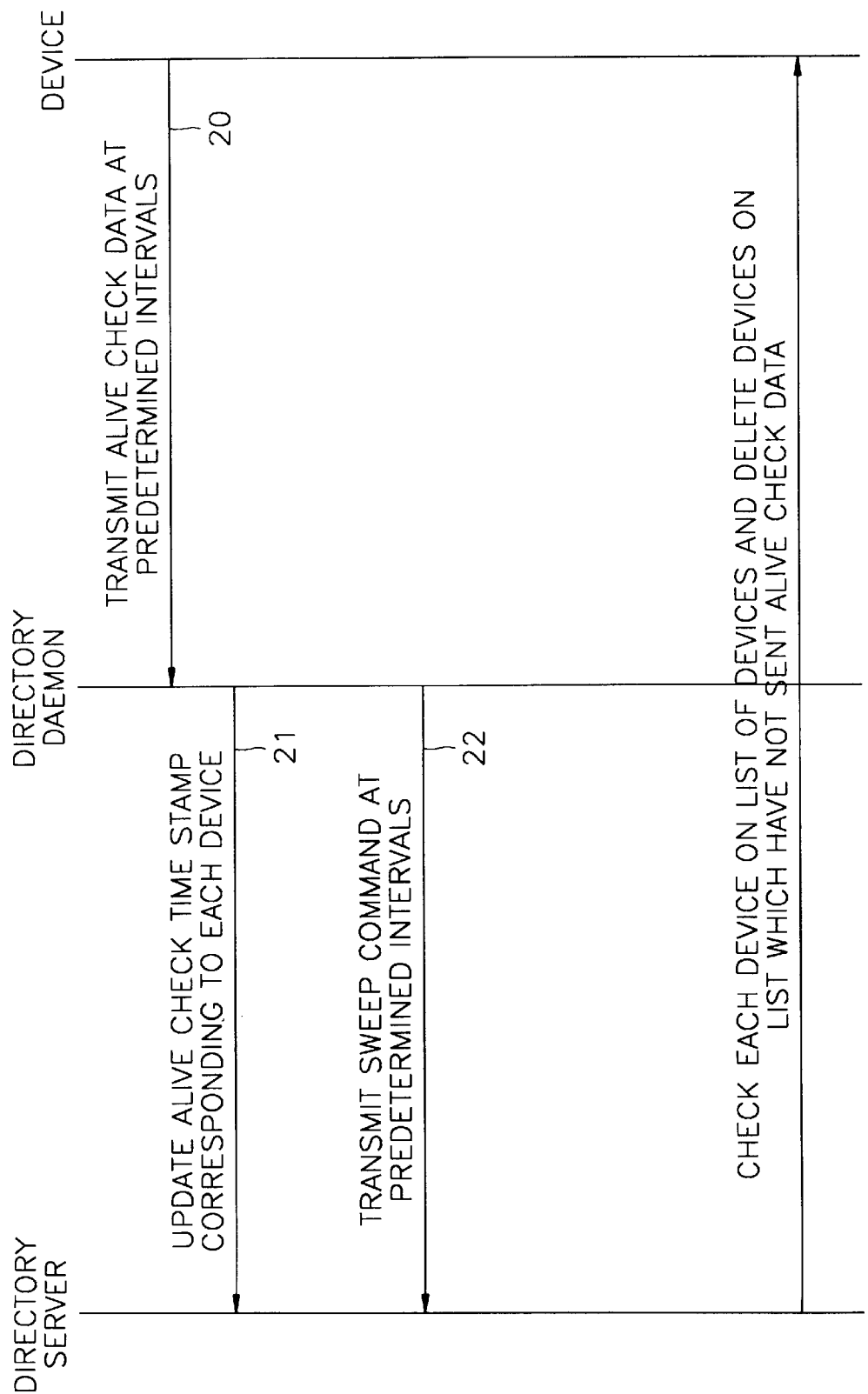

Figure 1:
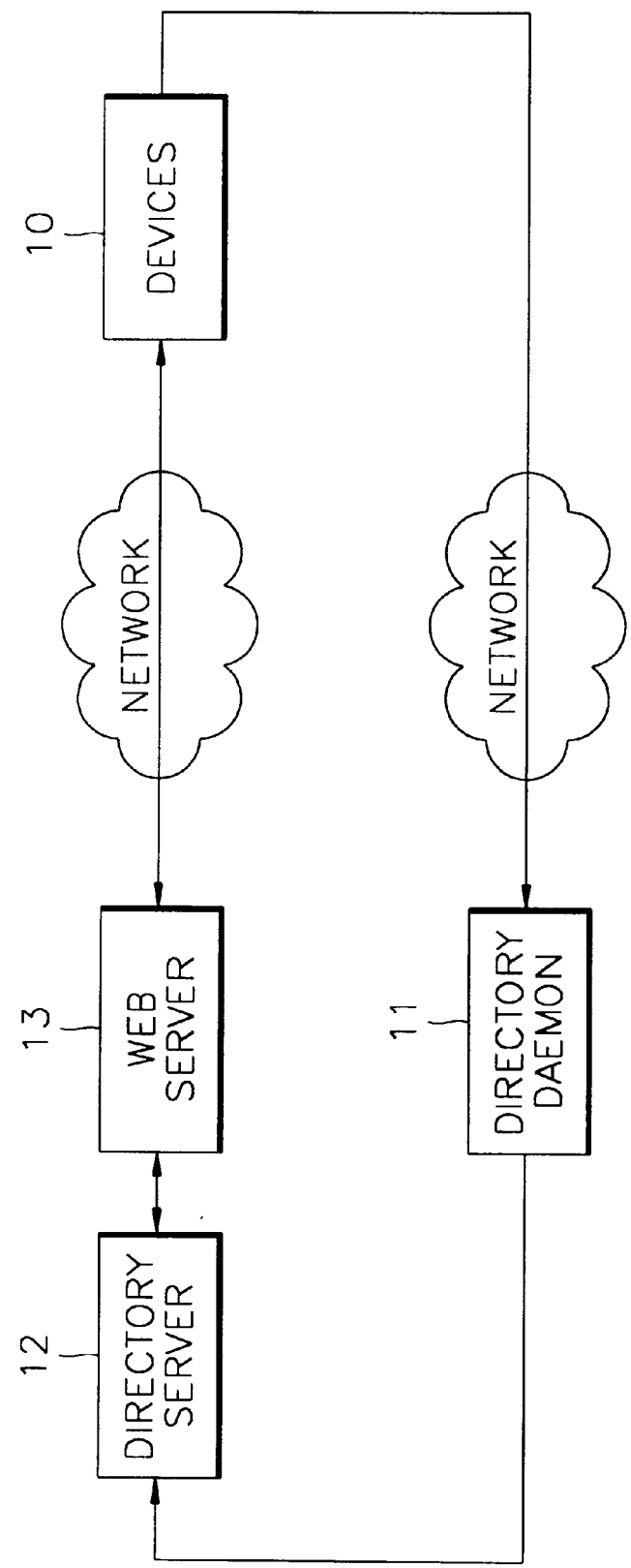

APPARATUS INCLUDING DIRECTORY SERVER, FOR DETECTING OPERATIONS OF DEVICES, AND METHOD USED BY THE APPARATUS

BACKGROUND OF THE INVENTION

1. Field of the Invention

The present invention relates to a data communications apparatus and a data communications method, and more particularly, to an apparatus including a directory server, for detecting the operations of devices, and a method used by the apparatus, which shows a list of normal devices to a user by removing abnormal devices from the list managed by the directory server when devices start to function abnormally.

2. Description of the Related Art

In Internet communications where various devices are connected to a server, the Internet communications are confused by devices which operate abnormally. Namely, if devices that operate abnormally are not deleted from the device management list of a directory server, a wrong list is shown to a user, thus confusing a user who wants to use the devices.

SUMMARY OF THE INVENTION

In order to solve the above problems, it is an object of the present invention to provide an apparatus for detecting the operations of devices, the apparatus including a directory server, which shows a list of normal devices to a user by removing abnormal devices from the device list managed by the directory server when devices start to function abnormally.

It is another object of the present invention to provide a method by which the operations of devices are detected using a directory server, which shows a list of normal devices to a user by removing abnormal devices from the device list managed by the directory server when devices start to function abnormally.

To achieve the first object, there is provided an apparatus that includes a directory server, the apparatus for detecting whether devices listed in the directory server operate normally or abnormally, the apparatus also including a directory daemon continuously executed on a server, the directory daemon for receiving the alive check data of a plurality of devices at predetermined intervals, the directory server receiving and updating the devices' alive check data time received by the directory daemon, deleting the devices which have not transmitted the alive check data for a predetermined time from a management list by using the sweep command of the directory daemon, and outputting a list of the deleted devices to the devices not deleted, through a web server.

To achieve the second object, there is provided a method for detecting the operations of devices using a directory server in a communication apparatus comprising a plurality of devices, a directory daemon for monitoring the devices, a directory server, and a web server, including (a) the devices transmitting alive check data to the directory daemon at predetermined intervals, (b) the directory daemon transmitting the result obtained by receiving the alive check data to the directory server, (c) the directory daemon transmitting a device management command to the directory server at predetermined intervals, and (d) the directory server deleting the devices which have not transmitted the alive check data for a predetermined time from a management list and transmitting a list of the deleted devices to the devices not deleted, according to the management command.

BRIEF DESCRIPTION OF THE DRAWING(S)

The above objects and advantages of the present invention will become more apparent by describing in detail a preferred embodiment thereof with reference to the attached drawings in which:

FIG. 1 is a block diagram for showing the structure of an apparatus according to the present invention, in which the operations of devices are detected using a directory server; and FIG. 2 is a flowchart for showing the operation of a method for which the operations of devices are detected using a directory server.

DESCRIPTION OF THE PREFERRED EMBODIMENT

FIG. 1 is a block diagram for showing the structure of an apparatus for detecting the operations of devices using a directory server according to the present invention.

The apparatus shown in FIG. 1 includes a plurality of devices 10, a directory daemon 11, which is continuously executed on a server, for receiving alive check data from the devices 10 at uniform intervals, a directory server 12 for updating the devices' 10 alive check data time of the directory daemon 11 and deleting, from a device management list, those devices that do not transmit the alive check data in response to a sweep command of the directory daemon 11, and a web server 13 for performing communications with the devices and providing the device deletion result of the directory server 12 to the devices.

FIG. 2 is a flowchart for showing the operation of a method used by an apparatus according to the present invention, in which the operations of devices are detected in a directory.

The flowchart shown in FIG. 2 includes steps of transmitting alive check data at uniform intervals from a device to the directory daemon 11 (step 20), the directory daemon updating an alive check time stamp corresponding to each device to the directory server (step 21), the directory daemon transmitting a sweep command to the directory server at uniform intervals (step 22), the directory server checking each device on a list through the web server, deleting from the list devices that have not transmitted the alive check data for a certain time, and transmitting the list of the deleted devices to the devices 10 not deleted (step 23).

The present invention will be described in detail with reference to FIGS. 1 and 2.

The devices 10 start or terminate the Internet communications by logging on and off the web server 13.

The devices 10 transmit the alive check data to the directory daemon 11 through a network at uniform intervals (step 20). The directory daemon 11 is continuously executed on a server and monitors whether the devices 10 are operating normally by receiving the alive check data.

The directory daemon 11 transmits the alive check data to the directory server 12 and updates the alive check time stamp corresponding to the devices 10 (step 21). The directory daemon 11 receives the alive check data transmitted from the devices 10 at uniform intervals and transmits the result to the directory server 12. The directory server 12 continuously receives the result indicating whether the devices 10 operate normally from the directory daemon 11 at uniform intervals and updates the result.

The directory daemon 11 transmits the sweep command to the directory server 12 at uniform intervals (step 22). When the sweep command is transmitted to the directory server 12, the devices 10 operation list, which has been updated at predetermined intervals, is checked.

The directory server 12 checks the list for devices 10 through the web server 13, deletes the devices 10 which have not transmitted the alive check data for a certain time from the management list of the directory server 12, and transmits the list of the devices deleted to each of the devices which are not deleted (step 23). Therefore, it is possible to know whether the devices 10 are operating normally.

While this invention has been particularly shown and described with reference to preferred embodiments thereof, it will be understood by those skilled in the art that various changes in form and details may be made therein without departing from the spirit and scope of the invention as defined by the appended claims.

According to the present invention, only a list of currently normal devices is shown to a user by deleting abnormal devices from the management list of the directory server when devices become abnormal. Therefore, it is possible to check whether devices are operating normally, to thus let the user conveniently use the devices.

What is claimed is:

1. An apparatus for detecting whether a plurality of devices operate normally or abnormally, the apparatus comprising:

a directory daemon continuously executed on a server, the directory daemon operative to receive alive check data from each of the plurality of devices at predetermined intervals; and a directory server, for receiving and updating times the alive check data are received by the directory daemon, deleting the devices which have not transmitted the alive check data for a predetermined time from a management list according to a sweep command of the directory daemon, and outputting a list of the deleted devices to the non-deleted devices;

wherein the directory daemon and the directory server are different devices.

2. The apparatus as claimed in claim 1, further comprising a web server operative to receive the list of the deleted devices from the directory server and output the list of the deleted devices to the non-deleted devices.

3. The apparatus as claimed in claim 1, wherein the directory server automatically outputs the list of the deleted devices to the non-deleted devices.

4. A method of detecting operations of devices using a directory server in a communication system comprising a plurality of devices, a directory daemon for monitoring the devices, a directory server, and a web server, comprising the steps of:

(a) the devices transmitting alive check data to the directory daemon at predetermined intervals;

(b) the directory daemon transmitting a result, obtained by receiving the alive check data, to the directory server;

(c) the directory daemon transmitting a device management command to the directory server at predetermined intervals; and (d) the directory server deleting devices which have not transmitted the alive check data for a predetermined time from a management list and then transmitting a list of the deleted devices to non-deleted ones of the devices, according to the management command;

wherein the directory daemon and the directory server are different devices.

* * * * *